Figure 1:
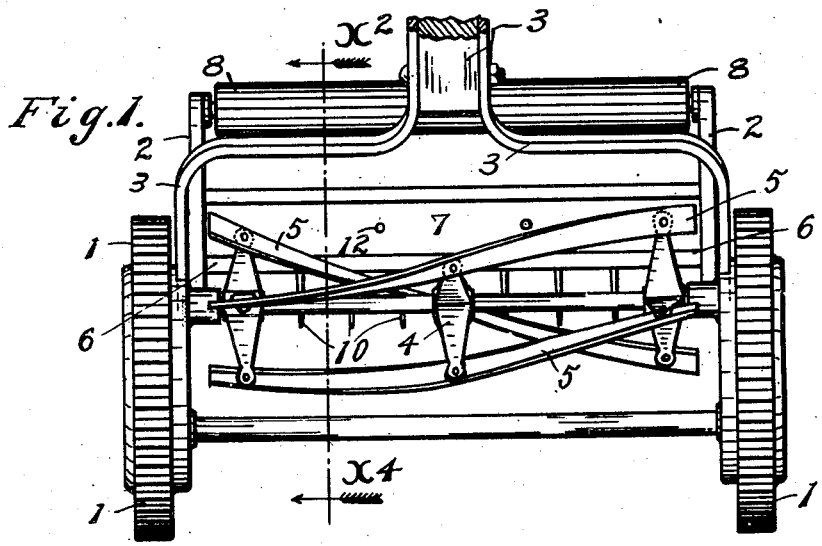

S. W. GOODING.
ATTACHMENT FOR LAWN MOWERS.
APPLICATION FILED MAY 11, 1908.

955,261.

Patented Apr. 19, 1910.

Witnesses:
H. H. Hunt.
Edna Cumpston.

Inventor:
Stephen W. Gooding
by Albert H. Merrill
his atty.

UNITED STATES PATENT OFFICE.

STEPHEN W. GOODING, OF LOS ANGELES, CALIFORNIA.

ATTACHMENT FOR LAWN-MOWERS.

955,261.  Specification of Letters Patent.  Patented Apr. 19, 1910.

Application filed May 11, 1908. Serial No. 432,321.

*To all whom it may concern:*

Be it known that I, STEPHEN W. GOODING, a citizen of the United States, residing at Los Angeles, California, have invented a new and useful Attachment for Lawn-Mowers, of which the following is a specification.

It is an object of this invention to provide means, in combination with the general construction of a lawn mower, to automatically raise creeping grasses and low spreading weeds into the path of the cutting blades, thereby to rid lawns of these undesirable vegetable growths.

My newly invented attachment is applicable to lawn mowers of various designs, but is more particularly intended for attachment to lawn mowers having bed knives of the pattern illustrated in the drawings, said attachment being secured to such bed knives or else substituted therefor.

Means are provided for removably securing the attachment to the mower, so that, it need be used in connection therewith only when it is deemed necessary to rid the lawn from creeping grasses.

Figure 2:
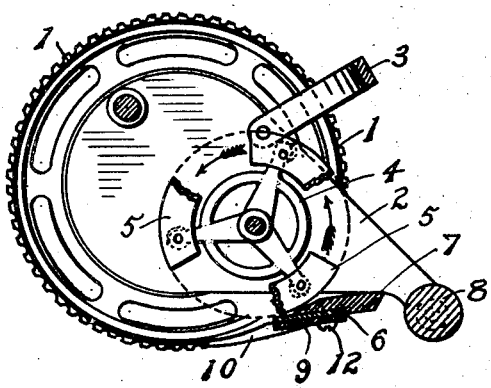
Figure 4:
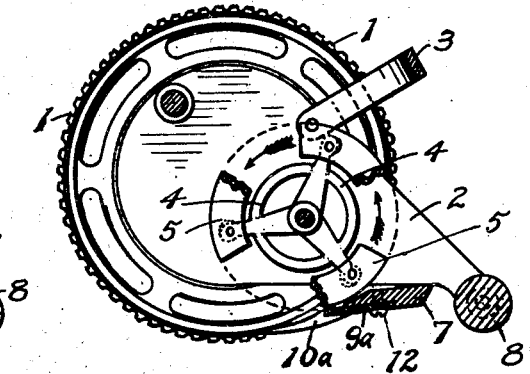
Figure 3:
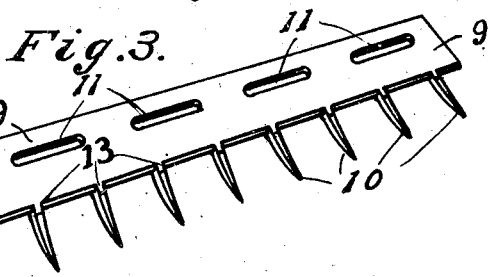
Figure 5:
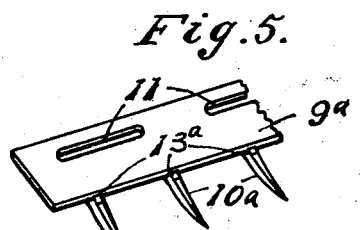

Referring now to the accompanying drawings, which illustrate the invention;—Figure 1 is a plan view of a lawn mower provided with the attachment. Fig. 2 is a cross section on line $X^2$—$X^4$ of Fig. 1. Fig. 3 is a perspective view of the attachment alone. Fig. 4 is a cross section similar to Fig. 2 but shows a somewhat modified form of the attachment adapted for use without the bed plate. Fig. 5 is a perspective view of a fragment of the form of the attachment shown in Fig. 4.

Referring in detail to the drawings, 1 designates the usual drive wheels, 2 the end pieces and 3 the bifurcated push bar, a fragment only of which is shown. Rotary cutter frame 4 carries the cutters 5 which coöperate with bed knife 6 to cut the grass.

7 designates the usual bed plate to which knife 6 is bolted.

8 is the ground roller. The parts thus far referred to are not described in detail because of being well-known and, considered by themselves, forming no part of the invention.

In order to improve upon the operation of the parts thus far described, so as to adapt the mower to cut off creeping grasses and spreading weeds nearly at the root, I provide an elongated, preferably rectangular plate 9 having a series of grass-lifting teeth 10 projecting forwardly and downwardly from the front edge of said plate. The lower side of the forward portion of each of said teeth desirably has the same inclination as the width of said plate, so that said teeth, although engaging the surface of the ground, move therealong without dipping into the soil to such an extent as to catch in the sod.

11 are slots extending longitudinally of plate 9, and 12 are bolts or screws extending through said slots to fasten plate 9 to bed knife 6. The object in providing plate 9 with slots instead of round holes is to make it possible to fasten a single pattern of plate to mowers having bed plates and bed knives of different sizes and patterns. The teeth 10 or $10^a$ have their lower sides curved from the place of union to the bed plate to the points of said teeth. This formation of the teeth adapts a considerable portion of the length of each tooth near its point to ride upon the surface of the ground, thus avoiding danger of catching into the soil as might occur if a shorter end portion of each tooth was upwardly curved. The space between adjacent teeth is several times as wide as the width of the respective teeth so that there is practically no danger of the teeth becoming clogged. The adjacent sides of the teeth are smooth and free from angular edges, which construction also lessens the danger of clogging.

In Figs. 4 and 5 a slightly modified form of the attachment is shown wherein the teeth $10^a$ are provided with a lower shoulder at $13^a$ so that said teeth do not come up quite to the top of plate of blade $9^a$, as they do with respect to plate 9 at 13 of Fig. 3. In consequence, when plate $9^a$ is used it may, if made of hard metal, be substituted for the usual bed knife 6; but plate 9 must be attached to knife 6, because, if blade 6 were omitted, the upper portion of teeth 10 would be struck by the cutters 5.

In both forms of the invention the shoulders 13 or $13^a$ at the upper sides of the teeth near the place of union of the teeth with the plate tend to lift the creeping grasses more completely into the path of the rotary cutters a little in advance of the front edge of the bed plate, thus to insure a more positive cutting of such grasses. It will also be seen that in both forms of the appliance the downwardly inclined teeth for lifting the creeping grasses are so attached to the sickle bar as to provide a distinct angle at the front edge of the bar above the base of the teeth to form a cutting edge at that point. So far as I am aware, teeth adapted for lifting low-lying grasses have not heretofore been so combined with the sickle bar as to leave an unobstructed angular cutting edge along the front of the bar or bed knife above the point of union of the teeth therewith.

I claim:

The combination, with the sickle bar or bed knife and rotary cutters of a lawn mower, of a series of downwardly inclined teeth adapted to lift creeping grasses into the path of said cutters, said teeth being united to said sickle bar so as to leave an unobstructed angular cutting edge along the front of the bar above the point of union of the teeth therewith.

In testimony whereof I have hereunto signed my name in the presence of two subscribing witnesses at Los Angeles, in the county of Los Angeles and State of California, this fourth day of May, 1908.

STEPHEN W. GOODING.

Witnesses:
ALBERT H. MERRILL,
FLORA H. FOSS.